United States Patent
Jeong et al.

(10) Patent No.: US 8,433,181 B2
(45) Date of Patent: Apr. 30, 2013

(54) APPARATUS AND METHOD FOR RECORDING DIGITAL MULTIMEDIA BROADCASTING

(75) Inventors: Ja Young Jeong, Kyounggi-do (KR); Jun Hyung Park, Kyounggi-do (KR)

(73) Assignee: LG Electronics Inc., Seoul (KR)

( * ) Notice: Subject to any disclaimer, the term of this patent is extended or adjusted under 35 U.S.C. 154(b) by 1302 days.

(21) Appl. No.: 11/397,685

(22) Filed: Apr. 5, 2006

(65) Prior Publication Data

US 2007/0104457 A1   May 10, 2007

(30) Foreign Application Priority Data

Nov. 9, 2005 (KR) .................. 10-2005-0106903
Dec. 14, 2005 (KR) .................. 10-2005-0122917

(51) Int. Cl.
*H04N 5/76* (2006.01)

(52) U.S. Cl.
USPC .......................................... 386/291; 386/294

(58) Field of Classification Search ............ 386/46
See application file for complete search history.

(56) References Cited

U.S. PATENT DOCUMENTS

| | | | |
|---|---|---|---|
| 2002/0106185 A1* | 8/2002 | Fujii et al. | 386/46 |
| 2004/0237104 A1* | 11/2004 | Cooper et al. | 725/38 |
| 2005/0289151 A1* | 12/2005 | Burke | 707/100 |

FOREIGN PATENT DOCUMENTS

| | | | |
|---|---|---|---|
| JP | 2002-271742 A | | 9/2002 |
| JP | 2005039577 | * | 2/2005 |
| KR | 10-2005-0052859 A | | 6/2005 |
| KR | 10-2005-0076930 A | | 7/2005 |
| KR | 10-2005-0091929 A | | 9/2005 |

* cited by examiner

*Primary Examiner* — William C Vaughn, Jr.
*Assistant Examiner* — Asher Khan
(74) *Attorney, Agent, or Firm* — Birch, Stewart, Kolasch & Birch, LLP

(57) ABSTRACT

A broadcasting recording apparatus including a broadcasting communication unit configured to request and receive a broadcast from a broadcasting system, and a recording unit configured to record the broadcast received by the broadcasting communication unit at an image quality set at the broadcasting communication unit.

12 Claims, 4 Drawing Sheets

FIG.5

| GENRE (CODE) | IMAGE QUALITY (DATA SPACE IS SUFFICIENT) | IMAGE QUALITY (DATA SPACE IS INSUFFICIENT) |
|---|---|---|
| MOVIE (00) | HIGH QUALITY | MEDIUM→LOW QUALITY |
| ADVERTISEMENT (01) | AUDIO | NO STORAGE |
| SPORTS (02) | MEDIUM QUALITY | LOW→AUDIO |
| COMICS (03) | MEDIUM QAULITY | LOW |

US 8,433,181 B2

APPARATUS AND METHOD FOR RECORDING DIGITAL MULTIMEDIA BROADCASTING

This application claims priority to Korean Patent Application No. 10-2005-0106903 and 10-2005-0122917 filed in Korea on Nov. 9, 2005 and Dec. 14, 2005 the entire contents of which is hereby incorporated by reference in its entirety.

BACKGROUND OF THE INVENTION

1. Field of the Invention

The present invention relates to a broadcasting recording apparatus and corresponding method, and more particularly, to a broadcasting recording apparatus and method that allows a user to set a particular image quality for a broadcast to be recorded.

2. Description of the Related Art

The Digital Multimedia Broadcasting (DMB) service is a broadcasting service that provides mobile and vehicle receivers with various digital multimedia signals including audio and video. The DMB service provides a high sound/image quality of CD (compact disk) or DVD (digital versatile disk) through a personal data assistant (PDA) or vehicle terminal.

Further, the DMB system was initially launched as a digital audio broadcasting system and is now includes multimedia services such as the simultaneous transmission of moving picture and/or data. In addition, DMB broadcasting terminals can download and store a desired broadcast allowing a user to view the recorded broadcast.

Turning now to FIG. 1, which is a flowchart of a related art DMB broadcasting recording method. As shown, a DMB broadcasting terminal accesses a DMB broadcasting channel so as to record a DMB broadcast (S101). Once the DMB broadcast channel is accessed, the users selects a desired broadcast (S102) and then records and stores the selected broadcast (S103).

The above-noted recording method is a unidirectional recording method. That is, when signals are weak or there are no signals during a recording operation, degraded images are stored and replayed. In addition, the damaged recorded files cannot be recovered. Further, there is no function that can record the DMB broadcasting at a desired image quality.

SUMMARY OF THE INVENTION

Accordingly, one object of the present invention is to address the above noted and other problems.

Another object of the present invention is to provide a broadcasting recording apparatus and method that allows for a specific recording quality to be selected.

To achieve these and other advantages and in accordance with the purpose of the present invention, as embodied and broadly described herein, the present invention provides in one aspect, a broadcasting recording apparatus including a broadcasting communication unit configured to request and receive a broadcast from a broadcasting system, and a recording unit configured to record the broadcast received by the broadcasting communication unit at an image quality set at the broadcasting communication unit.

In another aspect, the present invention provides a broadcasting recording method including requesting and receiving a broadcast from a broadcasting system, and recording the received broadcast at an image quality set at a broadcasting communication unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, wherein:

FIG. 5 is a table showing a recording quality setting based on a genre and an available memory space.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

According to a broadcasting recording apparatus and method of the present invention, a bi-directional digital broadcast can be recorded at a particular image quality set by a user. After the recording process has completed, data with a degraded image quality or data with an erroneous section are again requested and recorded. Therefore, the recorded file can be corrected and thus a broadcast with a desired quality can be recorded.

Figure 1:
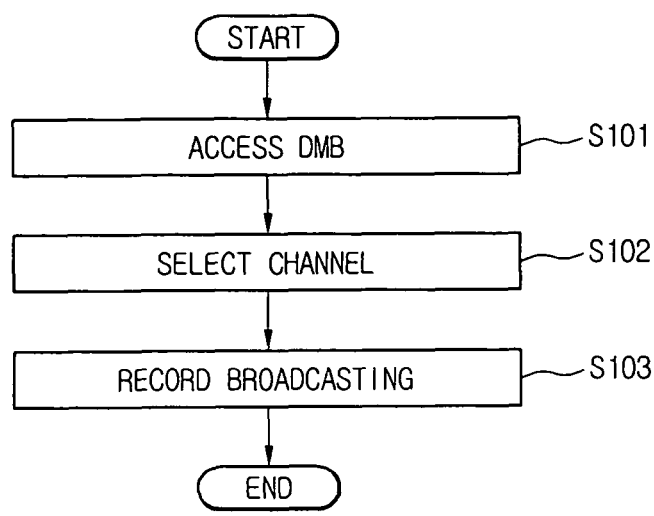
FIG. 1 is a flowchart of a related art DMB broadcasting recording method.
Figure 2:
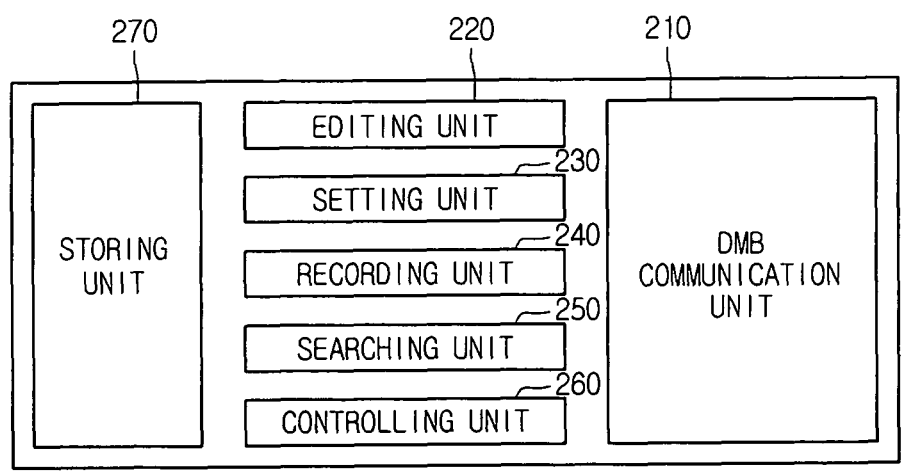
FIG. 2 is a block diagram of a DMB broadcasting recording apparatus in accordance with a first embodiment of the present invention.

Turning first to FIG. 2, which is a block diagram of a DMB broadcasting recording apparatus in accordance with a first embodiment of the present invention. As shown, the DMB broadcasting recording apparatus includes a DMB communication unit 210 that communicates with a DMB communication network in a bi-directional manner, a setting unit 230 for setting an image quality of the DMB broadcast received through the DMB communication unit 210, a recording unit 240 for recording the received DMB broadcast, a searching unit 250 for searching the recorded DMB broadcast, an editing unit 220 for editing the recorded DMB broadcast, and a controlling unit 260 for controlling the editing unit 220, the setting unit 230, the recording unit 240, the searching unit 240, and the DMB communication unit 210. Also included is a storing unit 270 for storing the recorded DMB broadcast data.

The above structure is provided for recording the DMB broadcast, and functional blocks for viewing the broadcasting are omitted.

Further, the DMB communication unit 210 is a communication module that provides bi-directional communication in a DMB broadcasting system. Also, the setting unit 230 can set a desired image quality for the DMB broadcast, and the recording unit 240 records and stores the selected broadcast in the storing unit 270.

In addition, a method of selecting the recording quality in the setting unit 230 can be classified into two categories. In more detail, the first method is to select a desired image quality according to programs, and the second method is to set an image quality according to program genres or according to an available amount of memory space in the storing unit 270. These methods may be used independently or together.

Further, according to the first method, the user reserves a recording of an on-air program using a desired program code or time. The user can also set an image quality to a high level, a medium level, or a low level, for example, or request the broadcast be in audio only. According to the second method, instead of the user directly selecting the image quality of programs, the user can select an image quality based on program genres, such as a movie, an advertisement, sports, comics, etc.

Also, in each method, it is also possible to estimate a file size of a to be recorded broadcasting program at a set image quality using the total broadcasting time of the program or a program genre. Therefore, before recording the program, a remaining memory or data space on the DMB terminal can be determined. If the remaining memory or data space is less than the estimated file size, the program can be recorded using a lower image quality according to a priority set by the user. The above noted features will be described below in more detail below.

Referring to FIG. 2, the searching unit 250 includes a function of searching a channel of a DMB broadcast, a function of searching a recorded broadcast, and a function of searching a genre of a corresponding program and a total broadcasting time of the selected program. Further, when searching the recorded broadcast data, the searching unit 250 searches whether the image satisfies the condition desired by the user, or whether a portion of the recorded broadcast has an error in it.

In addition, the controlling unit 260 controls operations of the DMB communication unit 210, the editing unit 220, the setting unit 230, the recording unit 240, the searching unit 250, and the storing unit 270. Also, the controlling unit 260 estimates a size of a broadcast to be recorded using the total broadcasting length and set image quality of the program, and checks a remaining memory or data space of the storing unit 270, so a desired broadcast can be recorded at an appropriate image quality.

Further, the user sets a desired image quality through the setting unit 23. Also, the searching unit 250 searches for a channel to be recorded among the DMB broadcasts. Then, if the user issues a recording command, the recording unit 240 stores the corresponding broadcast in the storing unit 270 at the set image quality.

After the broadcast is recorded, the searching unit 250 searches the recorded data and determines whether there is a portion with a lower image quality than the set level, or whether there is a portion including an error. If the image quality is lower than the set image quality or there is a portion with an error, the controlling unit 260 causes the searching unit 250 to search for a DMB channel corresponding to the requested broadcast requests the error portion of the corresponding broadcast data be retransmitted to the DMB communication unit 210, and then again records the corresponding portion.

As described above, the controlling unit 260 also allows the broadcast to be recorded at a lower image quality based on an amount of remaining memory or data space of the storing unit 270. Therefore, the broadcast is not recorded due to a insufficient amount of data space. Further, the DMB communication unit 210 also supports bi-directional communication and therefore a desired broadcast data can be requested and received.

In addition, the editing unit 220 edits and replaces the corresponding portion of the initial recorded broadcasting data with the new recorded data, thereby creating a broadcasting data with image quality set by the user.

Figure 3:
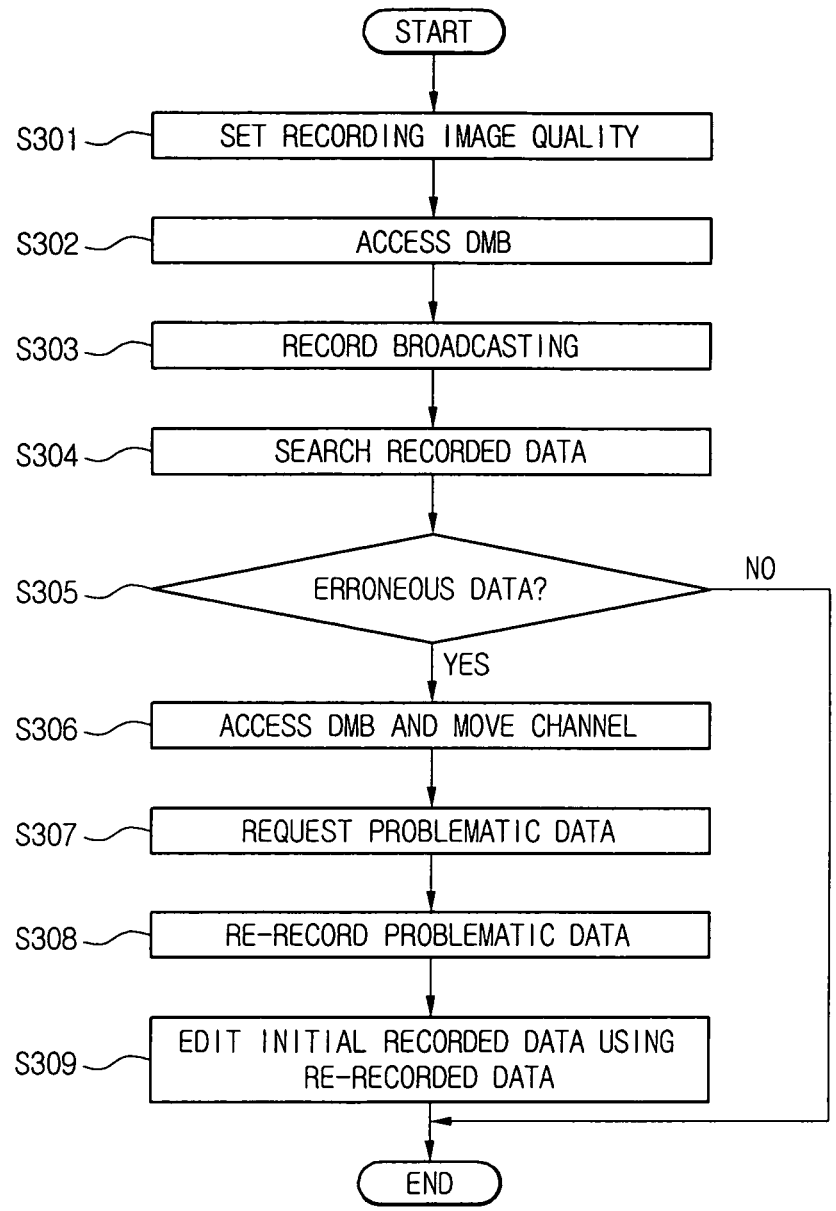
FIG. 3 is a flowchart of a DMB broadcasting recording method in accordance with a second embodiment of the present invention.

Turning next to FIG. 3, which is a flowchart of a DMB broadcasting recording method according to a second embodiment of the present invention. Referring to FIG. 3, the user sets a desired image quality using the setting unit 230 so as to record a DMB broadcast (S301). Then, the DMB broadcast terminal accesses the DMB broadcasting service using the DMB communication unit 210, searches for a desired channel, and then selects a broadcast to be recorded.

When the user selects a particular broadcast to be recorded, the recording unit 240 records and stores the selected DMB broadcast at the set image quality in the storing unit 270 (S303). When the designated broadcast has been completely recorded, the searching unit 250 searches whether the recorded broadcast data is recorded at the set image quality without error (S304). That is, the searching unit 250 determines whether there is data with a degraded image quality or error.

If the searching unit 250 determines there is a problem (Yes in S305), the controlling unit 260 again accesses the DMB broadcasting system through the DMB communication unit 210, moves to the channel of the corresponding broadcast, and requests the re-transmission of the required data alone (S306 and S307). As described above, the data request and reception are possible because the DMB broadcasting of the present invention uses a bi-directional broadcasting capability.

Further, the DMB broadcasting system re-transmits the problematic broadcast data requested in operation S307 (S308), and the recording unit 240 records the re-transmitted broadcasting data at the set image quality. Then, the searching unit 250 again searches to determine whether the recorded data is recorded at the set image quality. Hereinafter, it is assumed the data is again recorded at the set image quality.

Thus, after the problematic data is correctly re-recorded, the editing unit 220 edits the data recorded initially in operation S303 and the data recorded again in operation S308 and combines them into one broadcast data, completing the recording data of the broadcasting set by the user.

Although not shown in FIG. 3, the controlling unit 260 can also calculate a required amount of storage space using broadcasting time information and an image quality of the selected program, and thus determine whether the calculated space is available in the storing unit 270. When the remaining space is insufficient, the controlling unit 260 can inform the user of the space deficiency, or can allow the broadcasting to be automatically recorded at a lower image quality according to a priority set by the user. Therefore, the broadcast can be recorded without stopping due to the memory space deficiency.

Figure 4:
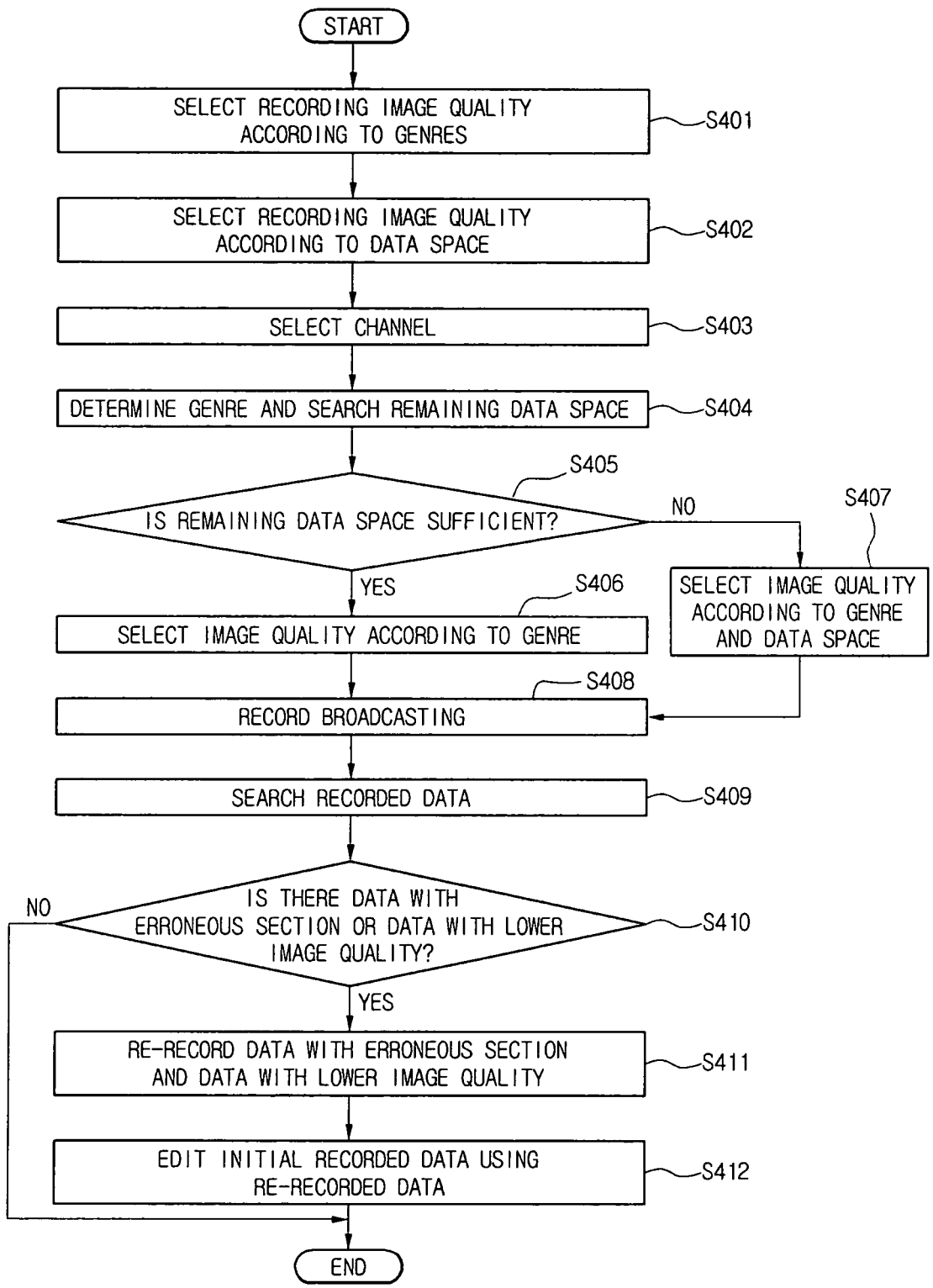
FIG. 4 is a flowchart of a DMB broadcasting recording method in accordance with a third embodiment of the present invention.

Turning next to FIG. 4, which is a flowchart illustrating a DMB broadcasting recording method in accordance with a third embodiment of the present invention. Referring to FIG. 4, the user first selects an image quality according to program genres (S401). That is, the image quality of the recording is set in advance according to the program genres, such as a movie, an advertisement, sports, etc. The image qualities may also be preset by the manufacturer. The recording image quality based on an available memory or data space as in FIG. 3 may then be applied (S402).

Further, when the user selects a desired DMB broadcast channel (S403), the controlling unit 260 determines a genre of the received broadcast, calculates a necessary data space, and searches for an amount of the remaining data space (S404 and S405). The features in the operation S404 will be described in detail with an example.

That is, when a DMB broadcast to be recorded is a movie, the controlling unit 260 preferentially selects an image quality matched to the movie and approximately calculates a necessary data space using a total playing time of the movie when recording the movie at the set image quality. In addition, the controlling unit 260 determines an amount of data space remaining in the storing unit 270.

If the remaining data space is sufficient with respect to the calculated necessary data space (Yes in S405), the controlling unit 260 controls the recording unit 240 to record the corresponding program at the set image quality matched to the genre. However, if the remaining data space is insufficient (No in S405), the controlling unit 206 selects an image quality according to the data capacity set in operation S402 and records the corresponding program at this image quality.

That is, the recording unit 240 records the DMB broadcast in the storing unit 270 according to the image quality set by the controlling unit 260. After completing the recording process, the searching unit 250 searches whether the recorded data is normally recorded according to the set image quality (S410). In addition, if the genre is changed while televising the DMB broadcast, the controlling unit 260 controls the recording unit 240 to record the program while continuously changing the image quality according to the changed genre and the remaining data space.

The searching of the normal/abnormal image quality in the searching unit 250 can be performed after completing the recording of all broadcast, or can be performed while the recording unit 240 records another broadcasting. This is differently applied according to the systems.

When a recorded data has a portion where an error occurs or a portion recorded at a lower image quality than the user-desired set level, the searching unit 250 informs the controlling unit 260 of this event, and the controlling unit 260 again requests the corresponding portion through the DMB communication unit 210. The requested data is then rebroadcast and recorded, and the controlling unit 260 combines the recorded data as discussed above with respect to FIG. 3 (S411 and S412). The re-recording and edit operations S411 and S412 can also be performed at the same time or can be performed separately after the broadcast is re-recorded.

An example of the image quality set based on the program genre and available memory or data space will now be described with reference to FIG. 5. Referring to FIG. 5, an image quality is set based on the program genres when the data space is sufficient, while the image quality is changed to a lower quality when the data space is insufficient.

In more detail, as shown in FIG. 5, when the image space is sufficient, a movie is set to be recorded at a high image quality, an advertisement is set to be recorded as an audio signal only, and a sports and comics feature is set to be recorded at a medium image quality. When the memory or data space is insufficient, the appropriates image qualities are recorded at a lower quality. For example, as shown in FIG. 5, a movie is set to be recorded at a medium to low image quality, an advertisement is set not to be recorded, a sports feature is set to be recorded at a low image quality or as an audio file, and a comics feature is set to be recorded at a low image quality.

In addition, because the DMB broadcast is a digital broadcast, the data contains information about a total broadcast time with respect to each broadcasting program. Therefore, the genres and broadcasting times of the different programs can be determined. Using this information, the required amount of data or memory space is calculated according to the image quality, and the recording process is performed based on the amount of available memory or data space.

Further, when the bi-directional digital broadcasting is provided, the desired broadcasting can be recorded at a desired image quality or an image quality set according to program genres. Also, only the data with a lower image quality or data with an erroneous section are requested, re-recorded, and combined with the original data. Accordingly, it is possible to obtain the broadcast data with an image quality desired by the user.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A broadcasting recording apparatus, comprising:
 a broadcasting communication unit configured to request and receive a broadcast from a broadcasting system;
 a recording unit configured to record the broadcast received by the broadcasting communication unit;
 a memory configured to store a table including genre types for different broadcasts, first image qualities to be used for recording the genre types for the different broadcasts when a remaining space of the memory is sufficient to record the genre types for the different broadcasts at the first image qualities, and second image qualities to be used for recording the genre types of the different broadcasts when the remaining space of the memory is insufficient to record the genre types for the different broadcasts at the first image qualities;
 a controlling unit configured to calculate how much space in the memory is required to record the requested broadcast based on at least one of a length of the requested broadcast and a set image quality, and when the controlling unit determines the remaining space of the memory is insufficient to record the requested broadcast, the controlling unit is further configured to automatically record the broadcast at the second image quality corresponding to the genre of the requested broadcast program stored in the table, and when the controlling unit determines the remaining space of the memory is sufficient to record the requested broadcast, the controlling unit is further configured to automatically record the broadcast at the first image quality corresponding to the genre of the requested broadcast program stored in the table.

2. The broadcasting recording apparatus according to claim 1, further comprising:
 a searching unit configured to search the recorded broadcast and to extract a portion of the broadcast with a lower image quality than the image quality set at the broadcasting communication unit or a portion of the broadcast in which an error occurs;

said controlling unit configured to control the recording unit to re-record the portion of the broadcast with the lower image quality or the portion of the broadcast in which the error occurs; and an editing unit configured to replace the portion of the broadcast with the lower image quality or the portion of the broadcast in which the error occurs with the re-recorded portion of the broadcast.

3. The broadcasting recording apparatus according to claim 1, wherein the broadcasting communication unit provides a bi-directional digital communication with the broadcasting system.

4. The broadcasting recording apparatus according to claim 1, wherein when the controlling unit determines the space available in the memory is not sufficient, the controlling unit is further configured to display an alerting message and/or an altering sound to inform the user of the broadcasting recording apparatus that the space available is not sufficient.

5. The broadcasting recording apparatus according to claim 1, wherein when the remaining space is insufficient, a movie genre of the broadcast is set to be recorded at a medium to low image quality.

6. The broadcasting recording apparatus according to claim 1, wherein when the remaining space is insufficient, an advertisement genre of the broadcast is set not to be recorded.

7. The broadcasting recording apparatus according to claim 1, wherein when the remaining space is insufficient, a sports feature genre of the broadcast is set to be recorded at a low image quality or as an audio file.

8. The broadcasting recording apparatus according to claim 1, wherein when the remaining space is insufficient, a comics feature genre of the broadcast is set to be recorded at a low image quality.

9. A broadcasting recording method, comprising:
requesting and receiving a broadcast from a broadcasting system;
calculating how much space in a memory is required to record the requested broadcast based on at least one of a length of the requested broadcast and a set image quality;
reading, from a memory of the broadcasting communication unit, a table including genre types for different broadcasts, first image qualities to be used for recording the genre types for the different broadcasts when a remaining space of the memory is sufficient to record the genre types for the different broadcasts at the first image qualities, and second image qualities to be used for recording the genre types of the different broadcasts when the remaining space of the memory is insufficient to record the genre types for the different broadcasts at the first image qualities; and when the calculating step determines the remaining space of the memory is insufficient to record the requested broadcast, automatically recording the broadcast at the second image quality corresponding to the genre of the requested broadcast program stored in the table, and when the calculating step determines the remaining space of the memory is sufficient to record the requested broadcast, automatically recording the broadcast at the first image quality corresponding to the genre of the requested broadcast program stored in the table.

10. The broadcasting recording method according to claim 9, further comprising:
searching the recorded broadcast and extracting a portion of the broadcast with a lower image quality than the image quality set at the broadcasting communication unit or a portion of the broadcast in which an error occurs;
re-recording the portion of the broadcast with the lower image quality or the portion of the broadcast in which the error occurs; and
replacing the portion of the broadcast with the lower image quality or the portion of the broadcast in which the error occurs with the re-recorded portion of the broadcast.

11. The broadcasting recording method according to claim 9, further comprising:
providing bi-directional digital communication between the broadcasting communication unit and the broadcasting system.

12. The broadcasting recording method according to claim 9, wherein when the calculating step determines the space available in the memory is not sufficient, the method further comprises displaying an alerting message and/or an altering sound to inform the user that the space available is not sufficient.

* * * * *